United States Patent Office 3,714,302
Patented Jan. 30, 1973

---

3,714,302
PREPARATION OF NEOALKYL PHENYL PHOSPHITE
James L. Dever, Lewiston, and James John Hodan, Williamsville, N.Y., assignors to Borg-Warner Corporation, Chicago, Ill.
No Drawing. Continuation-in-part of application Ser. No. 510,076, Nov. 26, 1965, now Patent No. 3,467,733, dated Sept. 7, 1969. This application July 8, 1969, Ser. No. 840,016
Int. Cl. C07d 105/04
U.S. Cl. 260—976     9 Claims

ABSTRACT OF THE DISCLOSURE

Cyclic phosphites, such as phenyl neopentyl phosphite are produced by reacting phenol in the melt with a crude reaction product of $PCl_3$ and a 2,2-di-lower alkyl-1,3-propane glycol and recovering the desired product by distillation. The cyclic phosphites are useful as stabilizers for organic compositions such as rubber and polyvinyl chloride.

BACKGROUND OF THE INVENTION

This application is a continuation-in-part of application Ser. No. 510,076 filed Nov. 26, 1965, now U.S. Pat. 3,467,733, granted Sept. 16, 1969.

This invention relates to a novel process for the preparation of 2-aryloxy-5,5-di-lower alkyl-1,3,2-dioxaphosphorinane compounds. 2-phenoxy-5,5-di-lower alkyl-1,3,2-dioxaphosphorinane compounds have been produced by transesterification of triphenyl phosphite with the appropriate 2,2-di-lower alkyl-1,3-propane diol in the presence of a base such as an alkali metal alkoxide or hydroxide as disclosed in U.S. 2,834,798 and U.S. 3,056,824. Furthermore, 2-aryloxy 5,5-di-lower alkyl-1,3,2-dioxaphosphorinane compounds have been produced by reaction of 5,5-di-lower alkyl-2-chloro-1,3,2-dioxaphosphorinane with phenol or an alkyl substituted phenol, in a solvent, followed by the addition of ammonia to remove HCl generated in the reaction, and product recovery as is disclosed in copending application Ser. No. 510,076, filed Nov. 26, 1965.

SUMMARY OF THE INVENTION

In accordance with the instant invention, it has been found that compounds of the type embraced by the formula:

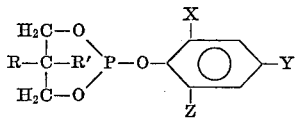

wherein R and R' are independently lower alkyl groups and X, Y and Z are independently selected from the group consisting of —H and alkyl groups of from 1 to 5 carbon atoms, providing that the sum of the carbon atoms in X, Y and Z does not exceed 5, may be simply and economically produced by the reaction of a neoglycol with $PCl_3$ in the absence of a catalyst, HCl acceptor and solvent to produce a crude product of the formula

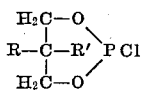

wherein R and R' are defined above, followed by reaction with phenol or a compound of the formula

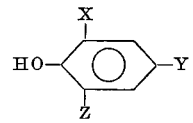

in which X, Y and Z are defined above. The desired product may be recovered by distillation.

Exemplary of the glycol reactants operable in the instant invention are those of the formula:

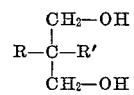

in which R and R' are independently selected from the group consisting of methyl, ethyl, propyl, butyl, pentyl and hexyl radicals. More specifically, the neo-type glycols utilizable in the invention are those glycols having beta, beta di-alkyl substitutions in which the beta-alkyl substituents contain from 1 to 6 carbon atoms. Specific neoglycols are 2,2-dimethyl-1,3-propane diol,
2,2-diethyl-1,3-propane diol,
2,2-dipropyl-1,3-propane diol,
22,-dibutyl-1,3-propane diol,
2,2-dipentyl-1,3-propane diol,
2,2-dihexyl-1,3-propane diol,
2-methyl-2-ethyl-1,3-propane diol,
2-methyl-2-propyl-1,3propane diol,
2-methyl-2-butyl-1,3-propane diol,
2-methyl-2-pentyl-1,3-propane diol,
2-methyl-2-hexyl-1,3-propane diol,
2-ethyl-2-propyl-1,3-propane diol,
2-ethyl-2-butyl-1,3-propane diol,
2-ethyl-2-pentyl-1,3-propane diol,
2-ethyl-2-hexyl-1,3-propane diol,
2-propyl-2-butyl-1,3-propane diol,
2-propyl-2-pentyl-1,3-propane diol,
2-propyl-2-hexyl-1,3-propane diol,
2-butyl-2-pentyl-1,3-propane diol,
2-butyl-2-hexyl-1,3-propane diol, and
2-pentyl-2-hexyl-1,3-propane diol.

By neo-type glycols or neoalkyl type glycols it is intended to embrace those glycols containing two alkyl substituents in beta position to the hydroxy functional group. Thus any glycol of the general formula

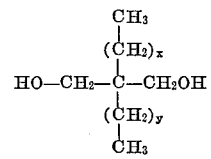

in which $x$ and $y$ are independently numbers of from 0 to 5, is operable in the process of this invention. There is no necessity to employ anhydrous glycol in the reaction. Commercial grade glycols such as neopentyl glycol, which contain approximately 0.5 to 1.0 percent water may be employed directly without any substantial hydrolysis of the desired acid chloride product.

However, since the intermediate acid chloride (cyclic phosphorochloridites) are readily hydrolyzed by water, the presence of substantial amounts of water in the glycol result in equally substantial reductions in yield. Therefore, if the water content of the glycol is in excess of the 0.5 to 1.0 percent range normally found in commercial glycols, drying of the glycol is beneficial.

The reaction between the neoalkyl glycol and PCl₃ may be conducted in known manner, as by mixing the reactants together at room temperature, or preferably, by cooling the PCl₃ to a temperature between 5–15 degrees centigrade prior to addition of glycol to the reactor. An excess of either reactant may be employed although it is preferred to operate with substantially stoichiometric amounts of the glycol and PCl₃. The reaction temperature is preferably maintained between 5–15 degrees centigrade. This temperature may be readily controlled by regulating the rate of glycol addition. The esterification reaction is quite exothermic in the absence of a solvent, but a temperature moderating effect is produced by the cooling effect of vigorous HCl evolution. Hence, by effective control of glycol addition, the reaction may be made self regulating in the temperature range between 5–15 degrees centigrade.

After the reaction has gone to completion, the bulk of the by-product HCl may optionally be removed by gently raising the temperature of the product to about 50 degrees centigrade and applying a vacuum.

The reaction between the 5,5-di-lower alkyl-2-chloro-1,3,2-dioxaphosphorinane product of the reaction discussed in the preceding paragraph and phenol or an alkyl substituted phenol my be conducted in the same reaction vessel that was employed to produce the crude intermediate by merely introducing the phenol into the reactor. If the temperature of the crude intermediate reactant is below the melting point of the phenol (41 degrees centigrade for phenol), the phenol may be added as a solid and the temperature of the entire reaction mixture raised to a temperature above the melting point of the phenol. Preferably, the crude 5,5-di-lower alkyl-2-chloro-1,3,2--dioxaphosphorinane intermediate is held at a temperature above the melting point of the phenol and the phenol is added in liquid state.

The reaction between a phenol and the crude 5,5-di-lower alkyl-2-chloro-1,3,2-dioxaphosphorinane may be carried out at a temperature between 35 to 100 degrees centigrade and preferably between about 45 to about 80 degrees centigrade. The pressure of the reaction system is maintained between about 50 millimeters mercury absolute to atmospheric pressure. The reaction reaches substantial completion in from 1 to about 8 hours and for practical purposes it is preferably operated under temperature and pressure conditions which will afford the maximum amount of product within 3 to about 5 hours. Although a stoichiometric excess of either reactant may be employed, it is preferred to operate with substantially stoichiometric quantities.

The phenolic reactant may be any compound of the formula

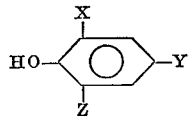

in which X, Y and Z are independently selected from the group consisting of —H and lower alkyl of 1–5 carbon atoms, providing that the sum of the carbon atoms of X, Y and Z does not exceed 5. This proviso essentially excludes such phenols as 2,6-di-tertiary butyl phenol from consideration because of steric hindrance problems.

After completion or near completion of the reaction, HCl generated during the process may readily be substantially removed by evacuating the reactor vessel. No special precautions need be taken to remove all the HCl present, as by addition of HCl acceptors or via controlled neutralization of the acidity. The product 2-phenol-5,5-di-lower alkyl-1,3,2-dioxaphosphorinane may then be recovered by distillation.

Unexpectedly, the 2-aryloxy-5,5-di-lower alkyl-1,3,2-dioxaphosphorinane compounds are produced in excellent yields in the presence of HCl. Normally, HCl will cleave an aryl dialkyl phosphite very readily by the reaction:

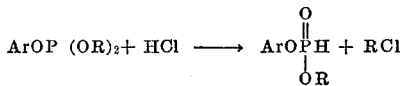

wherein Ar represents an aryl group and R represents an alkyl group. The same reaction occurs readily with most cyclic alkylene aryl phosphites as follows:

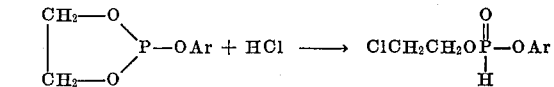

and

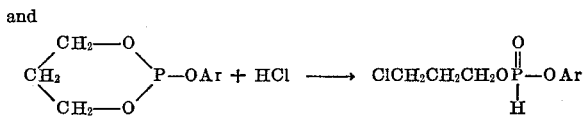

It has been found that for some unknown reason, the neoalkyl aryl phosphites do not undergo this reaction even at temperatures as high as 100 degrees centigrade. The 4- and 6-substituted 2-aryloxy-5,5-di-lower alkyl-1,3,2-dioxaphosphorinane compounds appear to be more labile toward HCl than the unsubstituted analogues. Hence, the valuable 2 - aryloxy - 5,5-di-lower alkyl-1,3,2-dioxaphosphorinane compounds may be produced by the disclosed, unexpectedly simple method, which especially suits them for production by existing commercial process techniques.

The following examples are presented to illustrate the process of this invention.

EXAMPLE I

A one liter flask was charged with 218.4 grams (1.59 moles) of PCl₃. The PCl₃ was cooled to 10 degree centigrade and 156.3 grams (1.5 moles) neopentyl glycol was added as a solid. The temperature of the reactor was maintained between 5 to 15 degrees centigrade during addition of the glycol. The reactant mixture was stirred at room temperature (reactor temperature 10 degrees centigrade) for one hour at which time the mixture was subjected to 35 millimeters mercury (absolute) pressure for one half hour. Then the reaction mixture was gradually warmed to 50 degrees centigrade at 25 millimeters mercury (absolute) pressure.

To the crude reaction product was added at 50 millimeters mercury (absolute) pressure and 40 degrees centigrade, 141.2 grams (1.5 moles) of molten phenol. The mixture was then heated as follows:

| Pot temperature (degrees centigrade) | Pressure (millimeters mercury absolute) | Time (hours) |
|---|---|---|
| 50 | 50 | 0.5 |
| 50 | 25 | 0.5 |
| 50 | 10 | 0.5 |
| 80 | 1–4 | 2.5 |

Distillation of the reaction product residue yielded 287.5 grams (84.6 percent conversion based upon the glycol reactant) of 2 - phenoxy - 5,5 - dimethyl-1,3,2-dioxaphosphorinane; B.P. 87–89° C. (0.5 millimeters mercury absolute), $\eta_D^{25}$ 1.5140–5150.

EXAMPLE II

A one liter flask was charged with 436.8 grams (3.18 moles) of PCl₃. This was cooled to 10 degrees centigrade and then 312.5 grams (3.0 moles) of neopentyl glycol was added portion-wise in solid form while maintaining the temperature, which was mostly self-regulating, between 5 to 15 degree centigrade. The mixture was then stirred at room temperature for 1.2 hours, heated to 100 degrees centigrade and subsequently concentrated at 50 degrees centigrade and 25 millimeters mercury absolute. The product was then heated to 50 degrees centigrade at 50 millimeters mercury absolute and 282.4 grams (3.0 moles)

of molten phenol was added dropwise at 45 to 50 degrees centigrade and between 50 to 70 millimeters mercury over a period of about 0.8 hour. The mixture was then heated at 50 degrees centigrade for 0.5 hour intervals at 25 to 10 millimeters mercury absolute, respectively, and then at 75 degrees centigrade, 4 to 5 millimeters mercury absolute for 4 hours.

The product was gradually heated to 120 degrees centigrade with an increase in pressure as HCl was expelled at which time the pressure decreased. Distillation of the residue yielded 554.9 grams (81.8 percent conversion based upon the glycol reactant) of 2-phenoxy-5,5-dimethyl-1,3-dioxaphosphorinane.

EXAMPLE III

An one liter flask was charged with 425.8 grams (3.1 moles) of $PCl_3$. This was cooled to 10 degrees centigrade and then 312.2 grams (3.0 moles) of neopentyl glycol was added as a solid while the temperature was maintained between 5 and 15 degrees centigrade. The mixture was stirred at room temperature for 1.2 hours, heated to 95 degrees centigrade, and after cooling, the mixture was concentrated to 55 degrees centigrade at 25 millimeters mercury absolute.

The reaction mixture was subjected to a vacuum of 50 millimeters mercury absolute and warmed to 45 degrees centigrade at which time, 282.4 grams (3.0 moles) of molten phenol was added dropwise over a period of one hour at 50 millimeters mercury absolute pressure and at a temperature between 45 to 55 degrees centigrade. Subsequently, the mixture was heated at 55 degrees centigrade, 50 millimeters mercury for 0.5 hour. Then the pressure was reduced to 25 millimeters mercury for 0.5 hour; 10 millimeters mercury for 0.5 hour and finally at a temperature between 70 to 80 degrees centigrade and pressure of 0.8 to 1.5 millimeters mercury for 5 hours.

Distillation of the product afforded 542.4 grams (80 percent conversion based upon the glycol reactant) of the desired 2 - phenoxy - 5,5 - dimethyl-1,3,2-dioxaphosphorinane product.

Under substantially the same reaction conditions, the other beta, beta dialkyl 1,3-propane diols referred to supra, as well as alkyl substituted phenols, undergo reaction to afford their respective products with correspondingly good yields.

We claim:

1. In a process wherein a crude reaction product of substantially stoichiometric amounts of $PCl_3$ and a 2,2-di-lower alkyl-1,3-propane diol are reacted, followed by the removal of the by-product HCl, and further reacted with a compound of the formula

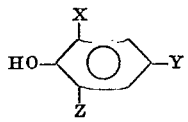

in which X, Y and Z are independently selected from the group consisting of —H and alkyl of 1–5 carbon atoms and the sum of the carbon atoms in X, Y and Z does not exceed 5, the improvement comprising the steps of carrying out said latter reaction at a temperature between about 35° C. and 100° C. and a pressure of between about 15 ml. of mercury absolute and an atmospheric pressure for from 1–8 hours, and recovering the 2-aryloxy-5,5-di-lower alkyl-1,3,2-dioxaphosphorinane by distillation of the product residue without removal of any HCl formed in said last reaction.

2. The process of claim 1 in which X, Y and Z are hydrogen.

3. The process of claim 1 in which said temperature is between about 45 to 80 degrees centigrade.

4. The process of claim 1 in which said reaction with phenol is conducted for him about 3 to 5 hours.

5. The process of claim 1 in which said phenol is added to said crude reaction product as a melt.

6. The process of claim 1 in which said 2,2-di-lower alkyl-1,3-propane diol is 2,2-dimethyl-1,3-propane diol.

7. An improved process for the production of 2-phenoxy-5,5-dimethyl-1,3,2 - dioxaphosphorinane which consists essentially in reacting 2,2-dimethyl-1,3-propane diol with $PCl_3$ in substantially stoichiometric amounts followed by removal of the HCl formed to produce a crude reaction product containing 2-chloro-5,5-dimethyl-1,3,2-dioxaphosphorinane, the improvement comprising the step of adding phenol to said crude reaction product and reacting the mixture at a temperature between about 35 to about 100 degrees centigrade and a pressure of between about 50 millimeters mercury absolute to atmospheric pressure for from 1 to 8 hours, and recovering the desired product by distillation without removal of any HCl formed in the reaction between phenol and the crude reaction product.

8. The process of claim 7 in which said phenol is added to said 5,5-dimethyl-2-chloro-phosphorinane as a melt.

9. The process of claim 7 wherein the reaction of the $PCl_3$ with the diol takes place at the temperature range of 5–15° C.

References Cited

UNITED STATES PATENTS 3,006,946  10/1961  Lanham _____ 260—973 X

OTHER REFERENCES

Rossiiskaya et al., "Chemical Abstracts," vol. 42 (1948), p. 2924, QD1A51.

LEWIS GOTTS, Primary Examiner

A. H. SUTTO, Assistant Examiner

U.S. Cl. X.R.

260—973